Jan. 13, 1948. G. E. FEIKER, JR 2,434,610
MICROWAVE POWER MEASURING INSTRUMENT
Filed June 19, 1944
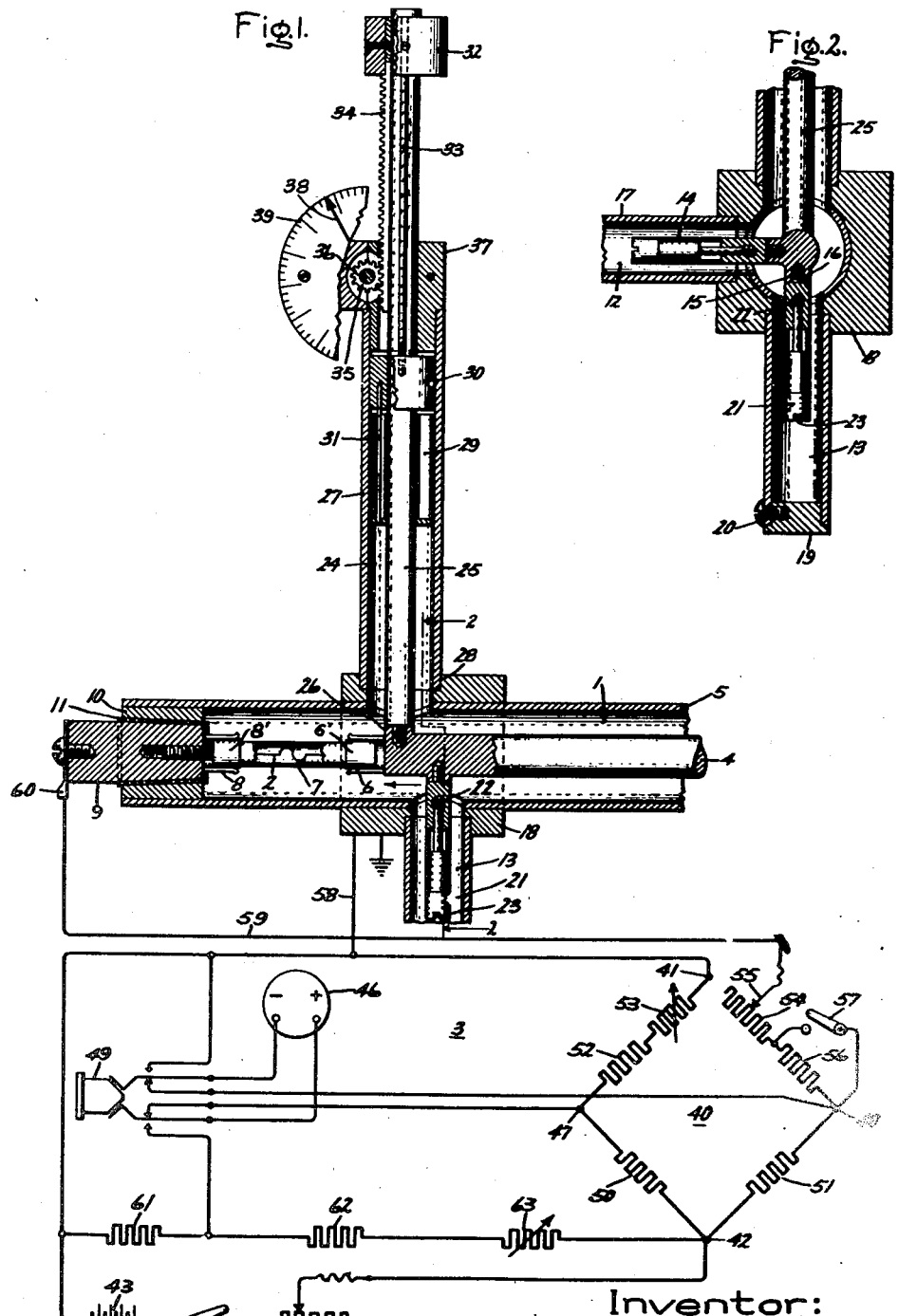
Inventor:
George E. Feiker, Jr.,
by Harry E. Dunham
His Attorney.

Patented Jan. 13, 1948

2,434,610

UNITED STATES PATENT OFFICE 2,434,610

MICROWAVE POWER MEASURING INSTRUMENT

George E. Feiker, Jr., Albany, N. Y., assignor to General Electric Company, a corporation of New York Application June 19, 1944, Serial No. 540,945

10 Claims. (Cl. 171—95)

My invention relates to instruments for measuring ultra high frequency power and it has for its object to provide a new and improved microwave wattmeter.

For measurements of small amounts of power in the microwave band, the barretter principle has been employed. The radio frequency power to be measured is applied to a platinum filament through a matching device which has the function of transforming the impedance of the filament to that of the input line. The filament is made one arm of a Wheatstone bridge which is initially balanced with unidirectional power in the filament. A measure of the applied radio frequency power is obtained by a reduction of the unidirectional power necessary to keep the bridge balanced or by the unbalanced current across the opposite points of the bridge which is proportional to the radio frequency power. It is an object of my invention to provide a new and improved microwave wattmeter of this type in which a single tunable element is required for operation of the meter.

It is a still further object of my invention to provide a new and improved measuring device for radio frequency power which is operable over a relatively wide band of wave lengths.

One of the features of my invention consists in the employment of a plurality of concentric transmission lines connected across a principal transmission line used for transmission of radio frequency power to be measured to a bolometer or detecting device. Certain of the plurality of transmission lines are fixed in length to afford reactance compensation at a desired frequency of the band width of the instrument so that the impedance presented to the line by the bolometer and matching section is purely resistive. A single tunable transmission line connected across the principal line between the compensating lines and the bolometer is utilized to provide compensation of reactance at other frequencies in the band of operation. A dial used in conjunction with the tunable line permits setting of the wattmeter in accordance with the frequency of the waves to be measured. Thereafter, the power of the incident electromagnetic waves is readable directly on an instrument connected across opposite points of the Wheatstone bridge of which the bolometer forms one arm.

For a better understanding of my invention, reference may be had to the following description taken in connection with the accompanying drawing and its scope will be pointed out in the appended claims. Fig. 1 is a view, partly in section and partly diagrammatic, of a microwave wattmeter embodying the invention and the bridge circuit which forms a part thereof; and Fig. 2 is a side view, partly in section, of a portion of the apparatus of Fig. 1.

Referring to Figs. 1 and 2 jointly, there is shown a principal transmission line 1 along which an electromagnetic wave whose power is to be measured is propagated and in which is inserted a resistance element or bolometer 2 and a metering circuit 3 for measuring changes in potential across the element 2. The transmission line 1 comprises a centrally disposed inner conductor 4 and a tubular outer conductor 5. At its left-hand end, the central conductor 4 is provided with a plurality of slots 6 which act as fingers for the reception of one metallic end 6' of a vitreous cartridge 7 enclosing the resistance element 2. The latter may be formed of any suitable metallic conductor having a resistance characteristic such that the resistance thereof varies directly, i. e., increases, with the power passing therethrough. One such suitable resistance element is a platinum wire. The opposite metallic end 8' of the cartridge 7 is adapted to fit into slotted spring-like fingers 8 in a fuse block 9 which is supported in an annular sleeve 10; being insulated therefrom by a layer of suitable insulating material 11, such as amphenol. The sleeve 10 is in metallic contact with the inner surface of the left-hand end of the outer conductor 5 and the members 9, 10, separated by the layer of insulation 11, form a concentric capacitor short-circuiting the left-hand end of the transmission line 1 for high frequency currents, while insulating the elements 9 and 10 for unidirectional currents.

Connected across the principal transmission line 1 are two stub lines 12, 13 (Fig. 2), identical in structure and each comprising a hollow inner conductor 14 in the form of a tuning plug body attached, by means of screw 15, to a boss 16 on inner conductor 4. Concentrically surrounding the tuning plug body 14 is a tubular outer conductor 17, one end of which is seated in a block 18 supported by the outer conductor 5 and the other end of which is closed by a cap 19 held in place by screw 20. The tuning plug body 14 is adapted to receive a tuning plug 21, one end of which is threaded to engage threads 22 in the tuning plug body and the opposite end of which is provided wiht a slot 23 to permit adjustment of the tuning plug and the effective electrical length of the stub transmission line.

Displaced longitudinally of the transmission line 1 from the stub lines 12, 13 and intermediate the stud lines and the bolometer 2 is a tuning reactance in the form of a transmission line 24 of adjustable length and comprising an inner conductor 25, the lower end of which is in screw-threaded engagement with a boss 26 on inner conductor 4 and a tubular outer conductor 27. The lower end of outer conductor 27 is adapted to fit into a suitable shoulder 28 in block 18. Means are provided for adjusting the effective electrical length of transmission line 24 and are shown as comprising a tuning plunger 29 of the capacitive type and comprising an annular metallic sleeve slidable along inner conductor 25 and in spaced relation with the tubular outer conductor 27. The annular plunger 29, having a length equal to a quarter wavelength at the mid-band frequency, is supported from a metallic piston 30 by means of a plurality of guide-rods 31. The piston 30, in turn, is supported from an anchor block 32 slidable along the inner conductor 25 by means of a plurality of guide-rods 33. The position of the anchor block is determined by means of a rack 34 carried thereby and a pinion 35 mounted on a shaft 36. The shaft 36 may be journaled in a bearing block 37 and may be turned by any suitable means, such as a knurled knob, not shown. Likewise, operated by movement of shaft 35 is a pointer 38 which cooperates with indicia 39 on a scale, calibrated preferably in terms of wave length of the high frequency waves traveling along transmission line 1.

The metering circuit 3 comprises a Wheatstone bridge 40 having terminals 41, 42 across which is impressed a unidirectional potential supplied by a battery 43 through an adjustable resistance 44 and a switch 45. A millivoltmeter 46 is connected across the opposite terminals 47, 48 of Wheatstone bridge 40 through the normally closed contacts of a push-button switch 49. Fixed resistances 50, 51 are connected between terminal 42 and terminals 47, 48. In the arm of the Wheatstone bridge between terminals 41, 47, there is connected a fixed resistor 52 and a rheostat 53. In the opposite arm of the Wheatstone bridge, namely, between terminals 41 and 48, the resistance element 2 is connected in series with a rheostat 54 having an adjustable contact 55 and a calibrating resistance 56 across which is connected a short-circuiting switch 57. The connection with the element 2 in this arm of the bridge is made by means of a conductor 58 connected between the block 18 and the lead to terminal 41 and a conductor 59 connected between a terminal 60 at the end of the fuse block 9 and the slider 55 on rheostat 54.

Means are provided for measuring the potential impressed across terminals 41, 42 and comprises serially connected resistances 61, 62 and the rheostat 63, the normally open contacts of push-button switch 49 being connected to opposite terminals of resistance 61.

In the use of the wattmeter for measuring power of ultra high frequency waves variable over a definite frequency band and propagated along transmission line 1, the length of line 24 is adjusted by means of plunger 29 to a quarter wave length at the mid-band frequency and the stub transmission lines 12, 13 are adjusted by means of the slots 23 in the ends of the tuning plugs 21 to provide a susceptance equal in magnitude and opposite in sign to the input susceptance of the transmission line 1 at the point of connection of lines 12, 13, thus providing a pure conductance input to the transmission line 1 at this point at this particular frequency. The length of line between the point of connection of line 24 there- with and the stub lines 12, 13 is chosen so as to transform the conductance of the bolometer 2 to the characteristic conductance of the transmission line 1 at the point of connection of stub lines 12, 13. Thus, no reflections occur on the line 1 to the right of the connection of the stub lines 12, 13 at the mid band frequency assuring that the power is absorbed by the element 2. As the frequency of the electromagnetic waves along the line 1 is changed, the position of the tuning plunger 29 is varied to add the necessary susceptance, negative for frequencies higher and positive for frequencies lower than the mid-frequency of the band, to make the input conductance at the point of connection of the stub lines 12, 13 equal to the characteristic conductance of the transmission line 1. The stub lines 12, 13 provide the values of susceptance required to tune out the susceptance component of the transformer admittance at this point of connection to line 1. The only adjustment of the wattmeter, therefore, for changes in the frequency of the incident waves is adjustment of the position of the tuning plunger 29 to vary the electrical length of stub line 24 to provide a susceptance which, transformed by the line 1 between lines 24 and lines 12, 13, in conjunction with the susceptance of lines 12, 13, gives admittance matching at the point of connection of lines 12, 13. The scale 39 is calibrated in wave length so that the position of the plunger may be set, once the wave length of the incident wave is known, to provide a conductance at the point of connection of the lines 12, 13 to the line 1 equal to the characteristic conductance of line 1.

The meter circuit 3 is calibrated in the absence of high frequency waves on the line 1 and when unidirectional current is flowing through the element 2. With the switch 57 closed, the values of rheostat 53 and the contact 55 are adjusted so that the meter 46 has a zero reading. Insertion of the resistance 56 in the arm of the bridge between contacts 41, 48 by opening of switch 57 simulates a radio frequency load on the line 1 for calibrating the scale of the meter 46 to read directly in terms of radio frequency power. Thereafter, the switch 57 is kept closed during actual operation of the wattmeter to measure radio frequency power.

In the operation of the meter to measure radio frequency power, all power from the input line is transmitted to the resistive element 2, the line 24 being adjusted by means of plunger 29 and the calibrated scale 39 to provide matching of the bolometer element 2 to the line 1 at the point of connection of lines 12, 13. A measure of the applied radio frequency power is obtained by the unbalanced current flowing between the terminals 47, 48 of the bridge.

While in the description of the invention the stub lines 12, 13 have been shown as open-circuited transmission lines, it is apparent that short-circuited lines of a length sufficient to provide a susceptance compensation at the point of connection to the line 1 may be used.

While I have shown a particular embodiment of my invention, it will of course be understood that I do not wish to be limited thereto since various modifications may be made, and I contemplate by the appended claims to cover any such modifications as wall within the true spirit and scope of my invention.

What I claim as new and desire to secure by Letters Patent of the United States is:

1. In combination, an ultra high frequency transmission line along which an electromagnetic wave to be measured is propagated, a first means connected in series with said line for producing a voltage varying in accordance with the power of said wave, second means connected across said line for eliminating residual susceptance of the portion of said line including said first means at the point of connection of said second means thereto, the length of said line between said first and second means being sufficient to transform the conductance of said first means to match the characteristic conductance of said line at a predetermined frequency, and adjustable means connected across said line at a point between said first and second means to provide for variations in said conductance matching produced by variations in the frequency of said wave.

2. An ultra high frequency measuring instrument comprising a concentric transmission line along which a wave to be measured is propagated, a first stub transmission line of fixed length connected thereacross, a second stub transmission line of adjustable length connected across said concentric line at a point spaced from said first stub line, and a resistance element connected in series with said concentric line, the resistance of said element varying in value in accordance with the power of said wave.

3. In combination, a concentric transmission line having inner and outer conductors, and means for measuring the power of an ultra high frequency wave transmitted over said line comprising a resistance element connected in series with said inner conductor, means responsive to changes in potential across said element produced by said wave, a stub transmission line connected across said concentric line and having a susceptance equal in magnitude and opposite in character to the residual susceptance of the portion of said line including said potential responsive means appearing at the point of connection of said stub line to said concentric line, and an adjustable transmission line connected across said concentric line at a point between said stub line and said element to match the conductance presented by said resistance element to said concentric transmission line at the point of connection of said stub line therewith with the characteristic conductance of said concentric line over the range of frequency of said wave.

4. A microwave measuring apparatus comprising a section of concentric transmission line along which an ultra high frequency wave to be measured is propagated, said section comprising an inner conductor and an outer conductor connected together at one end for waves of high frequency, a resistance element connected in series with said inner conductor, a pair of stub transmission lines of fixed length connected across said conductors at a point spaced from said element, said pair of lines having a susceptance equal in magnitude and opposite in character to the residual susceptance at the point of connection to said section whereby pure conductance is presented to said section, and means connected across said conductors between said point and said element for matching the conductance of said element to the characteristic conductance of said section over the frequency range of said waves.

5. A microwave wattmeter comprising a section of concentric transmission line along which an ultra high frequency wave to be measured is propagated, said section comprising an inner conductor and an outer conductor connected together at one end for waves of high frequency, a resistance element connected in series with said inner conductor, a pair of stub transmission lines of fixed length connected across said conductors at a point spaced from said element, said pair of lines having a susceptance equal in magnitude and opposite in character to the residual susceptance at the point of connection to said section, means connected across said conductors between said point and said element for matching the conductance of said element to the characteristic conductance of said section over the frequency range of said waves, and means responsive to the voltage across said element.

6. In a microwave wattmeter, the combination of a section of transmission line short-circuited at one end for high frequency waves, susceptance means connected across said line having a value equal in magnitude and opposite in sign to the residual susceptance of the portion of said line between said end and the point of connection of said means to said line, a resistance element connected in series with said line between said susceptance means and said end, and an adjustable susceptance connected across said line between said susceptance means and said element to match the conductance of said element to the characteristic conductance of said line for variations in the frequency of waves transmitted thereover.

7. A microwave measuring apparatus comprising a section of concentric transmission line having an inner conductor and a tubular outer conductor, said conductors being short-circuited at one of the ends of said section for high frequency currents, a resistance element connected in series with said inner conductor near said end, a pair of stub transmission lines connected across said section at a point displaced from said element and having a susceptance equal in magnitude and opposite in sign to the residual susceptance of said line between said end and the point of connection of said stub line to said concentric transmission line, and adjustable susceptance means connected across said line between said stub lines and said element to match the conductance of said element with the characteristic conductance of said section for changes in the frequency of waves propagated along said section.

8. An ultra high frequency measuring instrument comprising a section of concentric transmission line having an inner conductor and a tubular outer conductor connected together at one end for high frequency waves, fixed susceptance means connected across said line at a point displaced from said end and having a value equal in magnitude and opposite in sign to the residual susceptance between said end and the point of connection of said means to said line, a resistance element connected in series with said inner conductor between said end and said fixed susceptance means, and an adjustable susceptance connected across said line at a point between said resistance element and said fixed susceptance for matching the conductance of said element with the characteristic conductance of said line over the frequency range of said band.

9. A meter for measuring the power of waves over a band of ultra high frequencies comprising a section of concentric transmission line having an inner conductor and a tubular outer conductor connected together at one end for high frequency waves, fixed susceptance means connected across said line at a point displaced from said end and having a value equal in magnitude and opposite in sign to the residual susceptance of said line between said end and the point of connection of said means to said line, a resistance element connected in series with said inner conductor between said end and said fixed susceptance means, an adjustable susceptance connected across said line at a point between said resistance element and said fixed susceptance for matching the conductance of said element to the characteristic conductance of said line over the frequency range of said band, the resistance of said element varying in value in accordance with the power of said wave.

10. In a microwave measuring instrument, the combination of a section of coaxial transmission line short-circuited at one end for high frequency waves, said line comprising an inner conductor and a tubular outer conductor, a resistance element connected in series with said inner conductor adjacent to said end, adjustable susceptance means connected across said line at the end of said resistance element remote from said one end, said line having a fixed length adjacent said element, said susceptance means cooperating with said fixed length to match the conductance of said element with the characteristic conductance of said line at the end of said fixed length remote from said element, fixed susceptance means across said line at said last end, said last means having a value equal in magnitude but opposite in sign to the residual susceptance of said length at said last end.

GEORGE E. FEIKER, JR.

REFERENCES CITED

The following references are of record in the file of this patent:

UNITED STATES PATENTS

| Number | Name | Date |
| --- | --- | --- |
| 2,284,379 | Dow | May 26, 1942 |
| 2,323,076 | Paul | June 29, 1943 |
| 2,387,158 | Kazanowski | Oct. 16, 1945 |
| 1,901,741 | Fetsch | Mar. 14, 1933 |